(12) United States Patent
Nakagawa et al.

(10) Patent No.: US 7,304,110 B2
(45) Date of Patent: Dec. 4, 2007

(54) POLYMER, PROCESS FOR PRODUCING THE POLYMER AND CURABLE COMPOSITION CONTAINING THE POLYMER

(75) Inventors: Yoshiki Nakagawa, Hyogo (JP); Kenichi Kitano, Hyogo (JP); Nao Fujita, Hyogo (JP)

(73) Assignee: Kaneka Corporation, Osaka-shi (JP)

( * ) Notice: Subject to any disclaimer, the term of this patent is extended or adjusted under 35 U.S.C. 154(b) by 389 days.

(21) Appl. No.: 11/015,017

(22) Filed: Dec. 20, 2004

(65) Prior Publication Data

US 2005/0148737 A1 Jul. 7, 2005

Related U.S. Application Data

(62) Division of application No. 09/889,571, filed as application No. PCT/JP00/00452 on Jan. 28, 2000, now Pat. No. 6,855,780.

(30) Foreign Application Priority Data

Jan. 28, 1999 (JP) .................. 11-019744
Jan. 28, 1999 (JP) .................. 11-019745

(51) Int. Cl.
*C08F 293/00* (2006.01)
(52) U.S. Cl. .............. 525/299; 525/301; 525/302; 525/303; 525/308; 525/313; 525/314; 525/315; 525/316
(58) Field of Classification Search ........ 525/299, 525/301, 302, 303, 308, 313, 314, 315, 316
See application file for complete search history.

(56) References Cited

U.S. PATENT DOCUMENTS

| | | | |
|---|---|---|---|
| 4,808,664 A | 2/1989 | Saam | 525/106 |
| 5,312,871 A * | 5/1994 | Mardare et al. | 525/272 |
| 5,523,359 A | 6/1996 | Shaffer | 525/288 |
| 5,763,548 A | 6/1998 | Matyjaszewski et al. | 526/135 |
| 5,807,937 A | 9/1998 | Matyjaszewski et al. | 526/135 |
| 5,916,989 A | 6/1999 | Brookhart, III et al. | 526/348.6 |
| 6,162,882 A | 12/2000 | Matyjaszewski et al. | 526/111 |
| 6,420,492 B1 | 7/2002 | Kusakabe et al. | 525/370 |
| 6,423,787 B1 | 7/2002 | Kitano et al. | 525/366 |
| 6,441,101 B1 | 8/2002 | Kusakabe et al. | 525/342 |
| 6,455,645 B1 | 9/2002 | Melchiors et al. | 526/92 |
| 6,458,903 B1 | 10/2002 | Nakagawa et al. | 526/147 |
| 6,482,900 B1 | 11/2002 | Nakagawa et al. | 526/90 |
| 2002/0137841 A1 | 9/2002 | Nakagawa et al. | 525/100 |
| 2002/0188080 A1 | 12/2002 | Nakagawa | 525/247 |
| 2003/0065100 A1 | 4/2003 | Nakagawa et al. | 525/274 |

FOREIGN PATENT DOCUMENTS

| | | |
|---|---|---|
| DE | 199 42 614 A1 | 3/2001 |
| EP | 0 945 469 | 3/1999 |
| EP | 1 000 954 | 5/2000 |
| EP | 1 085 027 | 3/2001 |
| EP | 1 153 950 | 11/2001 |

* cited by examiner

*Primary Examiner*—Bernard Lipman
(74) *Attorney, Agent, or Firm*—Westerman, Hattori, Daniels & Adrian, LLP

(57) ABSTRACT

This invention provides a production method of a vinyl polymer having a functional group at a molecular chain terminus which comprises adding a compound (I) having a functional group and an internal alkenyl group or conjugated polyene compound (II) in the living radical polymerization of a radical-polymerizable vinyl monomer. The present invention relates to a vinyl polymer having a functional group at a molecular terminus, a production method of the same and a curable composition containing said polymer.

19 Claims, No Drawings

POLYMER, PROCESS FOR PRODUCING THE POLYMER AND CURABLE COMPOSITION CONTAINING THE POLYMER

This application is a divisional of prior application Ser. No. 09/889,571 filed on Apr. 23, 2002, now U.S. Pat. 6,855,780, which is a national stage of international application no. PCT/JP00/00452 filed on Jan. 28, 2000, the benefit of which is claimed under 35 U.S.C. §120.

TECHNICAL FIELD

The present invention relates to a vinyl polymer having a functional group at a molecular terminus, a production method of the same and a curable composition containing said polymer.

BACKGROUND ART

Polymers having a functional group at each of a plurality of molecular termini are known to crosslink by themselves or when combined with an appropriate curing agent and thereby give cured products excellent in heat resistance, durability, etc. Alkenyl-, hydroxyl- or crosslinking silyl-terminated polymers are typical examples. Alkenyl-terminated polymers are cured by crosslinking with a hydrosilyl group-containing compound as a curing agent or when subjected to photochemical reaction. Hydroxyl-terminated polymers, when reacted with a polyisocyanate, are cured under formation of urethane crosslinks. Crosslinking silyl-terminated polymers absorb moisture and give cured products in the presence of an appropriate condensation catalyst.

As examples of the main chain skeleton of such alkenyl-, hydroxyl- or crosslinking silyl-terminated polymers, there may be mentioned polyether type polymers such as polyethylene oxide, polypropylene oxide and polytetramethylene oxide; hydrocarbon type polymers such as polybutadiene, polyisoprene, polychloroprene, polyisobutylene, and hydrogenation products derived therefrom; polyester type polymers such as polyethylene terephthalate, polybutylene terephthalate and polycaprolactone and so forth. They are used in various fields of application according to the main chain skeleton and mode of crosslinking thereof.

Unlike those polymers obtainable by ionic polymerization or polycondensation, those functional group-terminated vinyl polymers which are obtainable by radical polymerization have scarcely been put to practical use. Among the vinyl polymers, (meth)acrylic polymers have those characteristics, such as high weathering resistance and transparency, among others, which cannot be attainable with the polyether type polymers, hydrocarbon type polymers and polyester type polymers mentioned above. Among them, those having an alkenyl or crosslinking silyl group on their side chain(s) are utilized in highly weathering resistant coatings. In the case of acrylic polymers, on the other hand, it is not easy to control the polymerization thereof because of side reactions involved therein; it is very difficult, for instance, to introduce a functional group into a terminus thereof.

If vinyl polymers having a crosslinking functional group, such as an alkenyl group, at a molecular chain terminus can be obtained in a simple and easy manner, cured products superior in cured product physical properties as compared with those having a crosslinking functional group on a side chain or chains will possibly be obtained. Thus, a number of researchers have so far searched for a method of producing them. It is not easy, however, to produce them industrially.

Japanese Kokai Publication Hei-05-255415 discloses a method of synthesizing (meth)acrylic polymers having an alkenyl group at both termini which uses an alkenyl-containing disulfide as a chain transfer agent. Japanese Kokai Publication Hei-05-262808 discloses a method of synthesizing (meth)acrylic polymers having an alkenyl group at both termini which uses a hydroxyl-containing disulfide as a chain transfer agent to thereby synthesize (meth)acrylic polymers having a hydroxyl group at both termini and then further utilizes the reactivity of the hydroxyl group. By these methods, however, it is not easy to realize the alkenyl group introduction into both termini with certainty. Further, for attaining terminal functional group introduction with certainty, it is necessary to use a chain transfer agent in large amounts. This is a problem from the production process viewpoint.

Accordingly, it is an object of the present invention to facilitate the production of vinyl polymers having a functional group at a molecular chain terminus by realizing the introduction of the functional group into a molecular chain with certainty by using a compound which is relatively readily available.

SUMMARY OF THE INVENTION

It is known that unactivated olefins, such as α-olefins, will not polymerize in radical polymerization in general. This is also the case with living radical polymerization, which has recently been studied widely.

The inventors have made intensive investigations independently and, as a result, found that when an unactivated (low in polymerizability) olefin is added to a living radical polymerization system, approximately only one molecule adds to each growing terminus. By utilizing this, they have now invented a production method of a polymer having various terminal functional groups.

According to the present invention, it is possible to terminally introduce a functional group by using an internal olefin compound whose commercial availability is growing.

Thus, in a first aspect, the invention provides a production method of a vinyl polymer having a functional group at a molecular chain terminus which comprises adding a compound (I) having a functional group and an internal alkenyl group either during polymerization or at the end point of polymerization to thereby introduce said functional group into a molecular chain terminus of the polymer in living radical polymerization of a radical-polymerizable vinyl monomer.

In the first aspect thereof, the invention is also concerned with a vinyl polymer, more specifically, a vinyl polymer having a functional group at a molecular chain terminus and being obtainable by the above-mentioned method of production;

a vinyl polymer having a crosslinking silyl group at a molecular chain terminus and being producible by reacting a vinyl polymer, which has an alkenyl group at a molecular chain terminus and is producible by the method mentioned above, with a crosslinking silyl-containing hydrosilane compound; and a vinyl polymer having a crosslinking silyl group at a molecular chain terminus and being producible by reacting a vinyl polymer, which has a hydroxyl or amino group at a molecular chain terminus and is producible by the method mentioned above, with a crosslinking silyl group-containing compound having a functional group capable of reacting with a hydroxyl or amino group.

In the first aspect thereof, the invention is further concerned with a curable composition comprising the above vinyl polymer, more specifically, a curable composition comprising:

(A) a vinyl polymer, which has an alkenyl group at a molecular chain terminus and is producible by the method mentioned above and (B) a compound having at least two hydrosilyl groups;

a curable composition comprising:

(A) a vinyl polymer, which has a hydroxyl or amino group at a molecular chain terminus and is producible by the method mentioned above and (B) a compound having at least two functional groups capable of reacting with a hydroxyl or amino group;

a curable composition comprising:

a vinyl polymer, which has a crosslinking silyl group at a molecular chain terminus and is producible by the method mentioned above; and a curable composition comprising:

(A) a vinyl polymer, which has an epoxy group at a molecular terminus and is producible by the method mentioned above and (B) an epoxy resin curing agent.

Meanwhile, it is well known that conjugated diene compounds, such as butadiene, can generally polymerize in radical polymerization, and such polymerization has been practiced industrially. Those are also used as monomers in living radical polymerization, too. However, no reports are available as yet about the utilization of that knowledge for terminal functional group introduction.

As a result of intensive investigations, the present inventors have invented a production method of a polymer having various functional groups, typically alkenyl groups, at a terminus which comprises adding a conjugated polyene compound to a living radical polymerization system.

Thus, in a second aspect, the present invention provides a production method of a vinyl polymer having a functional group at a molecular chain terminus which comprises adding a conjugated polyene compound (II) to thereby introduce a functional group derived from said compound (II) into the polymer molecular chain terminus of the polymer in living radical polymerization of a radical-polymerizable vinyl monomer.

In the second aspect thereof, the invention also relates to a vinyl polymer, more specifically, a vinyl polymer having a functional group at a molecular chain terminus and being obtainable by the method mentioned above;

a vinyl polymer having a crosslinking silyl group at a molecular chain terminus and being producible by reacting a vinyl polymer, which has an alkenyl group at a molecular chain terminus and is producible by the method mentioned above, with a crosslinking silyl-containing hydrosilane compound; and a vinyl polymer having a crosslinking silyl group at a molecular chain terminus and being producible by reacting a vinyl polymer, which has a hydroxyl or amino group at a molecular chain terminus and is producible by the method mentioned above, with a crosslinking silyl group-containing compound having a functional group capable of reacting with a hydroxyl or amino group.

In the second aspect thereof, the invention further relates to a curable composition comprising the above vinyl polymer, more specifically, a curable-composition comprising:

(A) a vinyl polymer, which has an alkenyl group at a molecular chain terminus and is producible by the method mentioned above and (B) a compound having at least two hydrosilyl groups;

a curable composition comprising:

(A) a vinyl polymer, which has a hydroxyl or amino group at a molecular chain terminus and is producible by the method mentioned above and (B) a compound having at least two functional groups capable of reacting with a hydroxyl or amino group;

a curable composition comprising:

a vinyl polymer, which has a crosslinking silyl group at a molecular chain terminus and is producible by the method mentioned above; and a curable composition comprising:

(A) a vinyl polymer, which has an epoxy group at a molecular terminus and is producible by the method mentioned above and (B) an epoxy resin curing agent.

DETAILED DESCRIPTION OF THE INVENTION

The first aspect of the invention is now described.

According to the first aspect of the invention, a vinyl polymer having a functional group at a molecular terminus can be produced by adding a compound (I) having a functional group and an internal alkenyl group during or at the end point of polymerization, thereby reacting the internal alkenyl group with a growing polymer terminus so that said functional group is introduced into the molecular chain terminus, in the living radical polymerization of a radical-polymerizable vinyl monomer.

In the first aspect of the invention, it is possible to allow approximately one molecule of compound (I) to react with one molecular chain terminus. It is thus possible to obtain a functional group-terminated vinyl polymer having a very well controlled structure. Since the functional group is bonded to the main chain via a carbon-carbon bond, this vinyl polymer is very stable from the weathering resistance or like viewpoint.

The above internal alkenyl group which the compound (I) has is not particularly restricted but includes, among others, the following:

$CH_3—CH=CH—$, $R^1—CH=CH—$, $CH_3—C(R^2)=C(R^3)—$, $R^1—C(R^2)=C(R^3)—$,

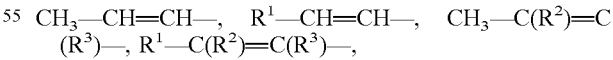

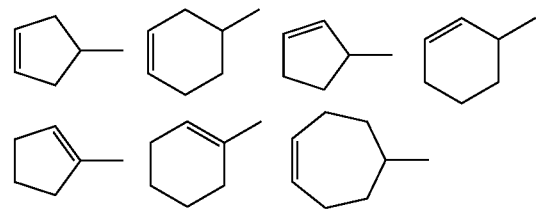

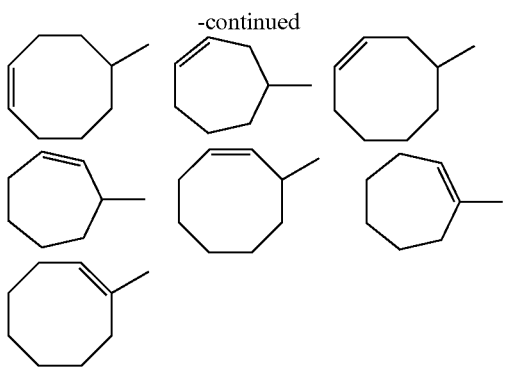

-continued

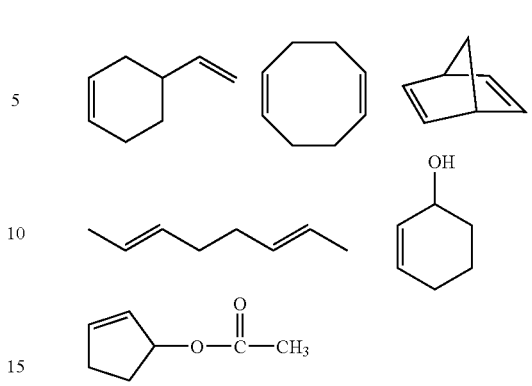

(In the formulas, $R^1$, $R^2$ and $R^3$ each is an organic group containing 1 to 20 carbon atoms, preferably a hydrocarbon group, and they may be bound to each other to form a ring structure.)

Specific examples of $R^1$, $R^2$ and $R^3$ include, but are not particularly limited to, the following:

—$(CH_2)_n$—, —$CH_3$, —$CH(CH_3)$—$(CH_2)_n$—, —$CH_3$, —$CH(CH_2CH_3)$—$(CH_2)_n$—$CH_3$, —$CH(CH_2CH_3)_2$, —$C(CH_3)_2$—$(CH_2)_n$—, —$CH_3$, —$C(CH_3)(CH_2CH_3)$—$(CH_2)_n$—, —$CH_3$, —$C_6H_5$, —$C_6H_5(CH_3)$, —$C_6H_5(CH_3)_2$, —$(CH_2)_n$—, —$C_6H_5(CH_3)$, —$(CH_2)_n$—$C_6H_5(CH_3)_2$ (n is an integer of not less than 0, and the total number of carbon atoms in each group is not more than 20.)

The functional group which the compound (I) has is not particularly restricted but includes, as preferred species, a hydroxyl group, an amino group, an epoxy group, a carboxyl group, an ester group, an ether group, an amide group, crosslinking silyl groups, and terminal or internal alkenyl groups. More preferred are a hydroxyl group, an amino group, an epoxy group, crosslinking silyl groups, and terminal or internal alkenyl groups. Particularly preferred are terminal or internal alkenyl groups.

In the present specification, the term "terminal alkenyl group" represents a group having a structure such that two hydrogen atoms are bonded to one of the carbon atoms constituting a carbon-carbon double bond, namely a group containing $CH_2=C$. The term "internal alkenyl group" represents an alkenyl group other than said terminal alkenyl group.

When the functional group which the compound (I) has is a terminal or internal alkenyl group, the compound (I) having a functional group and an internal alkenyl group represents a compound having two internal alkenyl groups or a compound having both an internal alkenyl group and a terminal alkenyl group. In this case, the two alkenyl groups are not conjugated.

When the functional group which the compound (I) has is a functional group possibly affecting the growing polymer terminus or catalyst, for example an amino, hydroxyl or carboxyl group, such functional group can be used in a form protected by a conventional protective group. As appropriate protective groups, there may be mentioned acetyl, silyl, alkoxy and like groups.

The compound (I) is not particularly restricted but specifically includes, among others, the following:

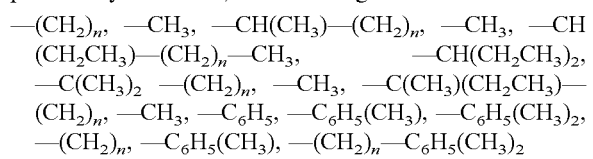

The compound (I) is preferably a functional group-containing cyclic olefin. The cyclic olefin includes, within the meaning thereof, cyclic hydrocarbons in which the ring-constituting carbon-carbon bonds partly include a carbon-carbon double bond(s). More preferred are terminal alkenyl-containing cyclic olefins or internal alkenyl-containing cyclic olefins. Particularly preferred are 4-vinylcyclohexene and 1,5-cyclooctadiene.

The "living radical polymerization" proceeds at a high rate of polymerization and hardly undergoes any termination reaction and gives a polymer with a narrow molecular weight distribution (an Mw/Mn value of about 1.1 to 1.5) in spite of its being a mode of that radical polymerization which is regarded as difficult to control because of tendency toward occurrence of termination reactions such as radical-to-radical coupling. It is also possible, in living radical polymerization, to arbitrarily control the molecular weight by adjusting the monomer/initiator charge ratio.

The "living radical polymerization" method thus can give a low viscosity polymer with a narrow molecular weight distribution and, in addition, makes it possible to introduce a specific functional group-containing monomer into the polymer mostly at desired sites and, therefore, is more preferred as the method to be used in the practice of the present invention.

While the term "living polymerization", in its narrower sense, means polymerization in which molecular chains grow while the termini thereof always retain their activity, said term generally includes quasi-living polymerization in which terminally inactivated molecules and terminally active molecules grow in a state of equilibrium. The latter definition applies to the living polymerization to be employed in the practice of the present invention.

Such "living radical polymerization" has recently been studied actively by various groups of researchers. As examples, there may be mentioned, among others, the use of a cobalt-porphyrin complex as described in the Journal of the American Chemical Society (J. Am. Chem. Soc.), 1994, vol. 116, pages 7943 ff, the use of a radical capping agent such as a nitroxide compound as described in Macromolecules, 1994, vol. 27, pages 7228 ff., and the technique of "atom transfer radical polymerization (ATRP)" which uses an organic halide or the like as the initiator and a transition metal complex as the catalyst.

Among the "living radical polymerization" techniques, the above-mentioned "atom transfer radical polymerization" technique, which uses an organic halide or halosulfonyl compound or the like as the initiator and a transition metal complex as the catalyst for polymerizing vinyl monomers, in addition to the above-mentioned features of "living radical polymerization", gives a polymer terminally having a halogen or the like, which is relatively advantageous to functional group conversion, and the degree of freedom in initiator and catalyst designing and, therefore, is more preferred as the production method of a vinyl polymer having a specific functional group. This atom transfer radical polymerization is described, for example, by Matyjaszewski et al. in the Journal of the American Chemical Society (J. Am. Chem. Soc.), 1995, vol. 117, pages 5614 ff.; Macromolecules, 1995, vol. 28, pages 7901 ff.; Science, 1996, vol. 272, pages 866 ff.; WO 96/30421 and WO 97/18247, and by Sawamoto et al. in Macromolecules, 1995, vol. 28, pages 1721 ff., among others.

In the practice of the invention, the atom transfer radical polymerization method is preferred because of ease of control and for other reasons, although there is no particular restriction as to which of the methods or techniques mentioned above is to be employed.

First, the technique which uses a radical capping agent such as a nitroxide compound is described. In this polymerization, a nitroxy free radical (=N—O·), which is generally stable, is used as the radical capping agent. While such a compound is not restricted, nitroxy free radicals from cyclic hydroxy amines, such as the 2,2,6,6-substituted-1-piperidinyl oxyradical and 2,2,5,5-substituted-1-pyrrolidinyl oxyradical, are preferred. Appropriate as the substituents are alkyl groups containing not more than 4 carbon atoms, such as methyl and ethyl groups. Specific nitroxy free radical compounds include, but are not limited to, the 2,2,6,6-tetramethyl-1-piperidinyl oxyradical (TEMPO), 2,2,6,6-tetraethyl-1-piperidinyl oxyradical, 2,2,6,6-tetramethyl-4-oxo-1-piperidinyl oxyradical, 2,2,5,5-tetramethyl-1-pyrrolidinyl oxyradical, 1,1,3,3-tetramethyl-2-isoindolinyl oxyradical and N,N-di-tert-butylamine oxyradical, among others. Such a stable free radical as the galvinoxyl free radical may also be used in lieu of the nitroxy free radical.

The above radical capping agent is used in combination with a radical generator. It is presumable that the reaction product from a radical capping agent and a radical generator serves as a polymerization initiator so that the polymerization of an addition-polymerizable monomer(s) proceeds. The mixing ratio of both is not particularly restricted but, appropriately, the radical initiator is used in an amount of 0.1 to 10 moles per mole of the radical capping agent.

Although various compounds can be used as the radical generator, a peroxide capable of generating a radical under polymerization temperature conditions is preferred. Such peroxide includes, but is not limited to, diacyl peroxides such as benzoyl peroxide and lauroyl peroxide, dialkyl peroxides such as dicumyl peroxide and di-tert-butyl peroxide, peroxydicarbonates such as diisopropyl peroxydicarbonate and bis(4-tert-butylcyclohexyl) peroxydicarbonate, alkyl peresters such as tert-butyl peroxyoctoate and tert-butyl peroxybenzoate, and the like. In particular, benzoyl peroxide is preferred. Further, another radical generator, for example a radical-generating azo compound, such as azobisisobutyronitrile, may also be used in lieu of the peroxide.

As reported in Macromolecules, 1995, vol. 28, page 2993, such alkoxyamine compounds as shown below may be used as the initiator instead of the combined use of a radical capping agent and a radical generator.

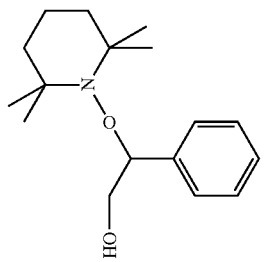

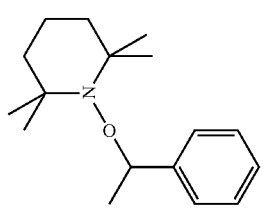

When an alkoxyamine compound is used as the initiator and it has a hydroxyl or like functional group, as shown above, a polymer terminated in the functional group is obtained. By applying this technique to the method of the invention, vinyl polymers having a functional group at each of both termini can be obtained.

The polymerization conditions such as the monomer(s) to be used in the polymerization using a radical capping agent e.g. a nitroxide compound as mentioned above, solvent and polymerization temperature are not restricted but may be the same as those used in atom transfer radical polymerization, which is to be mentioned below.

The technique of atom transfer radical polymerization, which is more preferred as the technique of living radical polymerization, is now described.

In this atom transfer radical polymerization, an organic halide, in particular an organic halide having a highly reactive carbon-halogen bond (e.g. an ester compound having a halogen at the α position, or a compound having a halogen at the benzyl position), or a halosulfonyl compound is preferably used as the initiator. Use is made, as the catalyst, of metal complexes the central metal of which belongs to the group 7, 8, 9, 10 or 11 of the periodic table of the elements. Particularly preferred as the metal species are zero-valent or monovalent copper, divalent ruthenium and divalent iron. As specific examples, there may be mentioned cuprous chloride, cuprous bromide, cuprous iodide, cuprous cyanide, cuprous oxide, cuprous acetate, cuprous perchlorate and the like. When a copper compound is used, a ligand, for example 2,2'-bipyridyl or a derivative thereof, 1,10-phenanthroline or a derivative thereof, an alkylamine such as tributylamine or a polyamine such as tetramethylethylenediamine, pentamethyldiethylenetriamine or hexamethyltriethylenetetramine, is added for increasing the catalytic activity. The tristriphenylphosphine complex of divalent ruthenium chloride ($RuCl_2(PPh_3)_3$) is also suited for use as a catalyst. When this catalyst is used, an aluminum compound, such as a trialkoxyaluminum, is added for increasing the activity of the catalyst. Further, the tristriphenylphosphine complex of divalent iron chloride ($FeCl_2(PPh_3)_3$) is also suited as the catalyst.

In this polymerization method, an organic halide or halosulfonyl compound is used as the initiator. Specific examples are as follows:

$C_6H_5$—$CH_2X$, $C_6H_5$—$C(H)(X)CH_3$, $C_6H_5$—$C(X)(CH_3)_2$, (in the above chemical formulas, $C_6H_5$ represents a phenyl group and X represents a chlorine, bromine or iodine atom):

$R^4$—$C(H)(X)$—$CO_2R^5$, $R^4$—$C(CH_3)(X)$—$CO_2R^5$, $R^4$—$C(H)(X)$—$C(O)R^5$, $R^4$—$C(CH_3)(X)$—$C(O)R^5$, (in the above formulas, $R^4$ and $R^5$ each represents a hydrogen atom or a $C_{1-20}$ alkyl group, aryl group or aralkyl group and X represents a chlorine, bromine or iodine atom), $R_1$—$C_6H_4$—$SO_2X$, (in the above formula, $R^4$ represents a hydrogen atom or a $C_{1-20}$ alkyl group, aryl group or aralkyl group and X represents a chlorine, bromine or iodine atom), and the like.

When an organic halide or halosulfonyl compound having a functional group in addition to a functional group (initiation site) for initiating the polymerization is used, a vinyl polymer having functional groups introduced therein at both termini can readily be obtained. As such functional group, there may be mentioned alkenyl, hydroxyl, epoxy, amino., amide, silyl and like groups.

The alkenyl-containing organic halide is not particularly restricted but includes, among others, compounds represented by the general formula 1:

$$R^{11}R^{12}C(X)—R^{13}—R^{14}—C(R^6)=CH_2 \quad (1)$$

wherein $R^6$ is a hydrogen atom or a methyl group, $R^{11}$ and $R^{12}$ each is a hydrogen atom or a monovalent $C_{1-20}$ alkyl, aryl or aralkyl group or are bound together at the respective other ends, $R^{13}$ is —C(O)O— (ester group), —C(O)— (keto group) or an o-, m- or p-phenylene group, $R^{14}$ is a direct bond or a divalent organic group containing 1 to 20 carbon atoms and optionally containing one or more ether bonds and X is a chlorine, bromine or iodine atom.

In these compounds, the halogen-bearing carbon atom is bonded to a carbonyl, phenyl or like group and the carbon-halogen bond is thus in an activated state, so that the polymerization can be initiated thereby.

As specific examples of $R^{11}$ and $R^{12}$, there may be mentioned hydrogen, methyl, ethyl, n-propyl, isopropyl, n-butyl, pentyl, hexyl and the like. $R^{11}$ and $R^{12}$ may be bound together at the respective other ends to form a ring skeleton and, in such case, —$R^{11}$—$R^{12}$— includes, among others, —$CH_2CH_2$—, —$CH_2CH_2CH_2$—, —$CH_2CH_2CH_2CH_2$—, —$CH_2CH_2CH_2CH_2CH_2$— and the like.

As specific examples of the alkenyl-containing organic halide represented by the general formula 1, there may be mentioned the following:

$XCH_2C(O)O(CH_2)_nCH=CH_2$, $H_3CC(H)(X)C(O)O(CH_2)_nCH=CH_2$, $(H_3C)_2C(X)C(O)O(CH_2)_nCH=CH_2$, $CH_3CH_2C(H)(X)C(O)O(CH_2)_nCH=CH_2$,

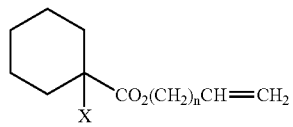

(in each of the above formulas, X is a chlorine, bromine or iodine atom and n is an integer of 0 to 20);

$XCH_2C(O)O(CH_2)_nO(CH_2)_mCH=CH_2$, $H_3CC(H)(X)C(O)O(CH_2)_nO(CH_2)_mCH=CH_2$, $(H_3C)_2C(X)C(O)O(CH_2)_nO(CH_2)_mCH=CH_2$, $CH_3CH_2C(H)(X)C(O)O(CH_2)_nO(CH_2)_mCH=CH_2$,

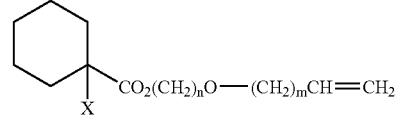

(in each of the above formulas, X is a chlorine, bromine or iodine atom, n is an integer of 1 to 20 and m is an integer of 0 to 20);

o, m, p-$XCH_2$—$C_6H_4$—$(CH_2)_n$—CH=$CH_2$, o, m, p-$CH_3C(H)(X)$—$C_6H_4$—$(CH_2)_n$—CH=$CH_2$, o, m, p-$CH_3CH_2C(H)(X)$—$C_6H_4$—$(CH_2)_n$—CH=$CH_2$, (in each of the above formulas, X is a chlorine, bromine or iodine atom and n is an integer of 0 to 20);

o, m, p-$XCH_2$—$C_6H_4$—$(CH_2)_n$—O—$(CH_2)_m$—CH=$CH_2$, o, m, p-$CH_3C(H)(X)$—$C_6H_4$—$(CH_2)_n$—O—$(CH_2)_m$—CH=$CH_2$, o, m, p-$CH_3CH_2C(H)(X)$—$C_6H_4$—$(CH_2)_n$—O—$(CH_2)_m$CH=$CH_2$, (in each of the above formulas, X is a chlorine, bromine or iodine atom, n is an integer of 1 to 20 and m is an integer of 0 to 20);

o, m, p-$XCH_2$—$C_6H_4$—O—$(CH_2)_n$—CH=$CH_2$, o, m, p-$CH_3C(H)(X)$—$C_6H_4$—O—$(CH_2)_n$—CH=$CH_2$, o, m, p-$CH_3CH_2C(H)(X)$—$C_6H_4$—O—$(CH_2)_n$—CH=$CH_2$, (in each of the above formulas, X is a chlorine, bromine or iodine atom and n is an integer of 0 to 20);

o, m, p-$XCH_2$—$C_6H_4$—O—$(CH_2)_n$—O—$(CH_2)_m$—CH=$CH_2$, o, m, p-$CH_3C(H)(X)$—$C_6H_4$—O—$(CH_2)_n$—O—$(CH_2)_m$—CH=$CH_2$, o, m, p-$CH_3CH_2C(H)(X)$—$C_6H_4$—O—$(CH_2)_n$—O—$(CH_2)_m$—CH=$CH_2$, (in each of the above formulas, X is a chlorine, bromine or iodine atom, n is an integer of 1 to 20 and m is an integer of 0 to 20).

As the alkenyl-containing organic halide, there may further be mentioned compounds represented by the general formula 2:

$$H_2C=C(R^6)—R^{14}—C(R^{11})(X)—R^{15}—R^{12} \quad (2)$$

wherein $R^6$, $R^{11}$, $R^{12}$, $R^{14}$ and X are as defined above and $R^{15}$ represents a direct bond, —C(O)O— (ester group), —C(O)— (keto group) or an o-, m- or p-phenylene group.

$R^{14}$ is a direct bond or a divalent organic group containing 1 to 20 carbon atoms (optionally containing one or more ether bonds). When it is a direct bond, the vinyl group is bonded to the halogen-bearing carbon atom, hence the compound is an allyl halide compound. In this case, it is not always necessary for the compound to have a C(O)O or phenylene group as $R^{15}$, since the carbon-halogen bond is activated by the neighboring vinyl group. Thus, it may be a direct bond. When $R^{14}$ is not a direct bond, a C(O)O group, a C(O) group and a phenylene group are preferred as $R^{15}$ so that the carbon-halogen bond may be activated.

As specific examples of the compound of general formula 2, there may be mentioned, among others, the following:

$CH_2$=$CHCH_2X$, $CH_2$=$C(CH_3)CH_2X$, $CH_2$=$CHC(H)(X)CH_3$, $CH_2$=$C(CH_3)C(H)(X)CH_3$, $CH_2$=$CHC(X)(CH_3)_2$, $CH_2$=$CHC(H)(X)C_2H_5$, $CH_2=CHC(H)(X)CH(CH_3)$ 2, $CH_2=CHC(H)(X)C_6H_5$, $CH_2=CHC(H)(X)CH_2C_6H_5$,
$CH_2=CHCH_2C(H)(X)—CO_2R$, $CH_2=CH(CH_2)_2C(H)(X)—CO_2R$,
$CH_2=CH(CH_2)_3C(H)(X)—CO_2R$, $CH_2=CH(CH_2)_8C(H)(X)—CO_2R$,
$CH_2=CHCH_2C(H)(X)—C_6H_5$, $CH_2=CH(CH_2)_2C(H)(X)—C_6H_5$,
$CH_2=CH(CH_2)_3C(H)(X)—C_6H_5$, (in each of the above formulas, X is a chlorine, bromine or iodine atom and R is a $C_{1-20}$ alkyl, aryl or aralkyl group).

As specific examples of the alkenyl-containing halosulfonyl compound, there may be mentioned, among others, the following:

o-, m-, p-$CH_2=CH—(CH_2)_n—C_6H_4—SO_2X$,
o-, m-, p-$CH_2=CH—(CH_2)_n—O—C_6H_4—SO_2X$, (in each of the above formulas, X is a chlorine, bromine or iodine atom and n is an integer of 0 to 20).

As regards the alkenyl-containing initiator, it is possible for the alkenyl group of that initiator as well to react with the polymer terminus. Therefore, care should be taken in selecting the polymerization reactions and the reaction conditions for the olefin compound to be added. As a specific example, there may be mentioned the addition of the olefin compound at an early stage of polymerization.

The crosslinking silyl-containing organic halide is not particularly restricted but includes, among others, compounds having a structure represented by the general formula 3:

$$R^{11}R^{12}C(X)—R^{13}—R^{14}—C(H)(R^6)CH_2—[Si(R^{16})_{2-b}(Y)_bO]_m—Si(R^{17})_{3-a}(Y)_a \quad (3)$$

wherein $R^6$, $R^{11}$, $R^{12}$, $R^{13}$, $R^{14}$, $R^{15}$, $R^{16}$, $R^{17}$, a, b, m, X and Y are as defined above.

As specific examples of the compound of general formula 3, there may be mentioned, among others, the following:
$XCH_2C(O)O(CH_2)_nSi(OCH_3)_3$, $CH_3C(H)(X)C(O)O(CH_2)_n Si(OCH_3)_3$,
$(CH_3)_2C(X)C(O)O(CH_2)_nSi(OCH_3)_3$, $XCH_2C(O)O(CH_2)_n Si(CH_3)(OCH_3)_2$,
$CH_3C(H)(X)C(O)O(CH_2)_n Si(CH_3)(OCH_3)_2$,
$(CH_3)_2C(X)C(O)O(CH_2)_n Si(CH_3)(OCH_3)_2$, (in each of the above formulas, X is a chlorine, bromine or iodine atom and n is an integer of 0 to 20);
$XCH_2C(O)O(CH_2)_nO(CH_2)_mSi(OCH_3)_3$,
$H_3CC(H)(X)C(O)O(CH_2)_nO(CH_2)_mSi(OCH_3)_3$,
$(H_3C)_2C(X)C(O)O(CH_2)_nO(CH_2)_mSi(OCH_3)_3$,
$CH_3CH_2C(H)(X)C(O)O(CH_2)_nO(CH_2)_mSi(OCH_3)_3$,
$XCH_2C(O)O(CH_2)_nO(CH_2)_mSi(CH_3)(OCH_3)_2$,
$H_3CC(H)(X)C(O)O(CH_2)_nO(CH_2)_mSi(CH_3)(OCH_3)_2$,
$(H_3C)_2C(X)C(O)O(CH_2)_nO(CH_2)_mSi(CH_3)(OCH_3)_2$,
$CH_3CH_2C(H)(X)C(O)O(CH_2)_nO(CH_2)_mSi(CH_3)(OCH_3)_2$, (in each of the above formulas, X is a chlorine, bromine or iodine atom, n is an integer of 1 to 20 and m is an integer of 0 to 20);

o, m, p-$XCH_2—C_6H_4—(CH_2)_2Si(OCH_3)_3$, o, m, p-$CH_3C(H)(X)—C_6H_4—(CH_2)_2Si(OCH_3)_3$, o, m, p-$CH_3CH_2C(H)(X)—C_6H_4—(CH_2)_2Si(OCH_3)_3$, o, m,
p-$XCH_2—C_6H_4—(CH_2)_3Si(OCH_3)_3$, o, m, p-$CH_3C(H)(X)—C_6H_4—(CH_2)_3Si(OCH_3)_3$, o, m, p-$CH_3CH_2C(H)(X)—C_6H_4—(CH_2)_3Si(OCH_3)_3$, o, m,
p-$XCH_2—C_6H_4—(CH_2)_2—O—(CH_2)_3Si(OCH_3)_3$, o, m, p-$CH_3C(H)(X)—C_6H_4—(CH_2)_2—O—(CH_2)_3Si(OCH_3)_3$, o, m, p-$CH_3CH_2C(H)(X)—C_6H_4—(CH_2)_2—O—(CH_2)_3Si(OCH_3)_3$, o, m, p-$XCH_2—C_6H_4—O—(CH_2)_3Si(OCH_3)_3$, o, m, p, —
$CH_3C(H)(X)—C_6H_4—O—(CH_2)_3Si(OCH_3)_3$, o, m, p-$CH_3CH_2C(H)(X)—C_6H_4—O—(CH_2)_3Si(OCH_3)_3$, o, m, p-$XCH_2—C_6H_4—O—(CH_2)_2—O—(CH_2)_3Si(OCH_3)_3$, o, m, p-$CH_3C(H)(X)—C_6H_4—O—(CH_2)_2—O—(CH_2)_3Si(OCH_3)_3$, o, m, p-$CH_3CH_2C(H)(X)—C_6H_4—O—(CH_2)_2—O—(CH_2)_3Si(OCH_3)_3$, (in each of the above formulas, X is a chlorine, bromine or iodine atom).

The crosslinking silyl-containing organic halide further includes compounds having a structure represented by the general formula 4:

$$(R^{17})_{3-a}(Y)_aSi—[OSi(R^{16})_{2-b}(Y)_b]_m—CH_2—C(H)(R^6)—R^{14}—C(R^{11})(X)—R^{15}—R^{12} \quad (4)$$

wherein $R^6$, $R^{11}$, $R^{12}$, $R^{13}$, $R^{14}$, $R^{15}$, $R^{16}$, $R^{17}$, a, b, m, X and Y are as defined above.

As specific examples of such compound, there may be mentioned, among others, the following:
$(CH_3O)_3SiCH_2CH_2C(H)(X)C_6H_5$, $(CH_3O)_2(CH_3)SiCH_2CH_2C(H)(X)C_6H_5$,
$(CH_3O)_3Si(CH_2)_2C(H)(X)—CO_2R$, $(CH_3O)_2(CH_3)Si(CH_2)_3 C(H)(X)—CO_2R$,
$(CH_3O)_2Si(CH_2)_4C(H)(X)—CO_2R$, $(CH_3O)_2(CH_3)Si(CH_2)_3 C(H)(X)—CO_2R$,
$(CH_3O)_3Si(CH_2)_4C(H)(X)—CO_2R$, $(CH_3O)_3(CH_3)Si(CH_2)_4 C(H)(X)—CO_2R$,
$(CH_3O)_2Si(CH_2)_9C(H)(X)—CO_2R$, $(CH_3O)_2(CH_3)Si(CH_2)_9 C(H)(X)—CO_2R$,
$(CH_3O)_3Si(CH_2)_3C(H)(X)—C_6H_5$, $(CH_3O)_2(CH_3)Si(CH_2)_3 C(H)(X)—C_6H_5$,
$(CH_3O)_3Si(CH_2)_4C(H)(X)—C_6H_5$, $(CH_3O)_2(CH_3)Si(CH_2)_4 C(H)(X)—C_6H_5$, (in each of the above formulas, X is a chlorine, bromine or iodine atom and R is a $C_{1-20}$ alkyl, aryl or aralkyl group).

The hydroxyl-containing organic halide or halosulfonyl compound is not particularly restricted but includes, among others, the following:

$HO—(CH_2)_n—OC(O)C(H)(R)(X)$ (in the above formula, X is a chlorine, bromine or iodine atom, R is a hydrogen atom or a $C_{1-20}$ alkyl, aryl or aralkyl group and n is an integer of 1 to 20).

The amino-containing organic halide or halosulfonyl compound is not particularly restricted but includes, among others, the following:

$H_2N—(CH_2)_n—OC(O)C(H)(R)(X)$ (in the above formula, X is a chlorine, bromine or iodine atom, R is a hydrogen atom or a $C_{1-20}$ alkyl, aryl or aralkyl group and n is an integer of 1 to 20).

The epoxy-containing organic halide or halosulfonyl compound is not particularly restricted but includes, among others, the following:

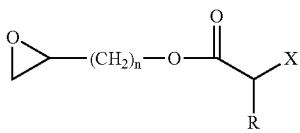

(in the above formula, X is a chlorine, bromine or iodine atom, R is a hydrogen atom or a $C_{1-20}$ alkyl, aryl or aralkyl group and n is an integer of 1 to 20).

For obtaining a vinyl polymer having two or more functional groups per molecule, an organic halide or halosulfonyl compound having two or more initiation sites is used as the initiator. As specific examples, there may be mentioned the following:

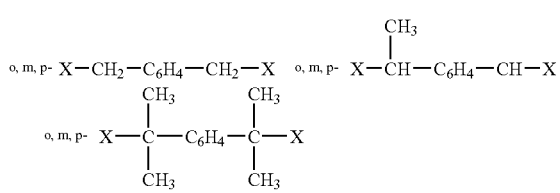

(wherein $C_6H_4$ represents a phenylene group and X is a chlorine, bromine or iodine atom);

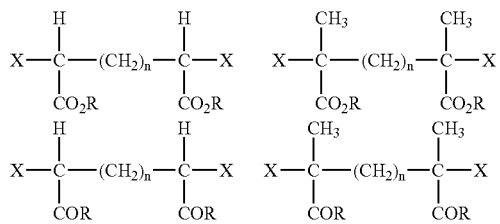

(wherein R is a $C_{1-20}$ alkyl, aryl or aralkyl group, n is an integer of 0 to 20 and X is a chlorine, bromine or iodine atom);

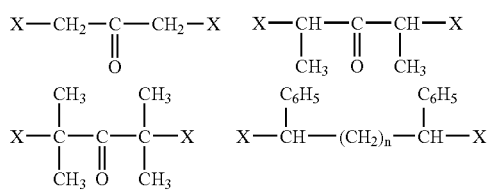

(wherein X is a chlorine, bromine or iodine atom and n is an integer of 0 to 20);

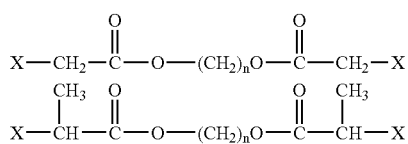

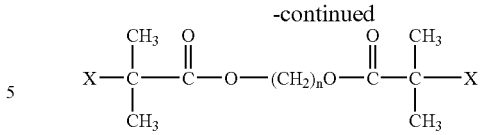

(wherein n is an integer of 0 to 20 and X is a chlorine, bromine or iodine atom);

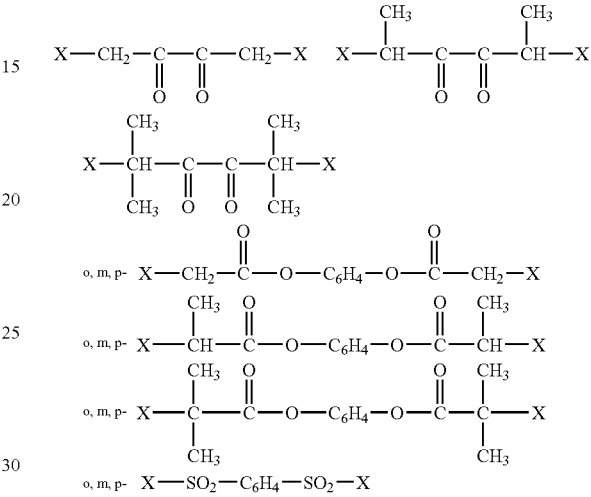

(wherein X is a chlorine, bromine or iodine atom).

The radical-polymerizable vinyl monomer to be used in this polymerization is not particularly restricted but includes various species. Since the polymerization system indicated herein is a living polymerization system, it is also possible to produce block copolymers by successively adding polymerizable monomers. As examples, there may be mentioned (meth)acrylic acid, methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-pentyl (meth)acrylate, n-hexyl (meth)acrylate, cyclohexyl (meth)acrylate, n-heptyl (meth)acrylate, n-octyl (meth)acrylate, 2-ethylhexyl (meth)acrylate, nonyl (meth)acrylate, decyl (meth)acrylate, dodecyl (meth) acrylate, phenyl (meth)acrylate, toluyl (meth)acrylate, benzyl (meth)acrylate, 2-methoxyethyl (meth)acrylate, 3-methoxybutyl (meth)acrylate, 2-hydroxyethyl (meth)acrylate, 2-hydroxypropyl (meth)acrylate, stearyl (meth)acrylate, glycidyl (meth)acrylate, 2-aminoethyl (meth)acrylate, γ-(methacryloyloxy)propyltrimethoxysilane, (meth)acrylic acid-ethylene oxide adducts, trifluoromethylmethyl (meth)acrylate, 2-trifluoromethylethyl (meth)acrylate, 2-perfluoroethylethyl (meth)acrylate, 2-perfluoroethyl-2-perfluorobutylethyl (meth)acrylate, 2-perfluoroethyl (meth)acrylate, perfluoromethyl (meth)acrylate, diperfluoromethylmethyl (meth)acrylate, 2-perfluoromethyl-2-perfluoroethylmethyl (meth)acrylate, 2-perfluorohexylethyl (meth)acrylate, 2-perfluorodecylethyl (meth)acrylate, 2-perfluorohexadecylethyl (meth)acrylate and like (meth)acrylic monomers; styrene, vinyltoluene, α-methylstyrene, chlorostyrene, styrene sulfonic acid and salts thereof, and like styrenic monomers; perfluoroethylene, perfluoropropylene, vinylidene fluoride and like fluorine-containing vinyl monomers; vinyltrimethoxysilane, vinyltriethoxysilane and like silicon-containing vinyl monomers; maleic anhydride, maleic acid, maleic acid monoalkyl esters and dialkyl esters; fumaric acid, fumaric acid monoalkyl esters and dialkyl esters; maleimide, methylmaleimide, ethylmaleimide, propylmaleimide, butylmaleimide, hexylmaleimide, octylmaleimide, dodecylmaleimide, stearylmaleimide, phenylmaleimide, cylcohexylmaleimide and like maleimide monomers; acrylonitrile, methacrylonitrile and like nitrile group-containing vinyl monomers; acrylamide, methacrylamide and like amide group-containing vinyl monomers; vinyl acetate, vinyl propionate, vinyl pivalate, vinyl benzoate, vinyl cinnamate and like vinyl esters; ethylene, propylene and like alkenes; vinyl chloride, vinylidene chloride, allyl chloride and allyl alcohol, among others. These may be used singly or a plurality of such monomers may be copolymerized. Among them, styrenic monomers and (meth)acrylic monomers are preferred from the viewpoint of physical properties of products, among others. Acrylic ester monomers are more preferred from the viewpoint of high reactivity in functional group introduction reactions and/or low glass transition point, for instance, and butyl acrylate is particularly preferred.

The polymerization can be carried without using any solvent or in various solvents. These are not particularly restricted but include, among others, hydrocarbon solvents such as benzene and toluene; ether solvents such as diethyl ether and tetrahydrofuran; halogenated hydrocarbon solvents such as methylene chloride and chloroform; ketone solvents such as acetone, methyl ethyl ketone and methyl isobutyl ketone; alcohol solvents such as methanol, ethanol, propanol, isopropanol, n-butyl alcohol and tert-butyl alcohol; nitrile solvents such as acetonitrile, propionitrile and benzonitrile; ester solvents such as ethyl acetate and butyl acetate; and carbonate solvents such as ethylene carbonate and propylene carbonate. These may be used singly or two or more of them may be used in admixture.

The polymerization can be carried out within the range of room temperature to 200° C., preferably 50 to 150° C.

When the compound (I), which has a functional group and an internal alkenyl group, is added during or at the end point of such polymerization, approximately one molecule of the compound adds to each terminus via the alkenyl group and, as a result, the functional group which the compound (I) has is introduced into the molecular terminus. The "end point" of polymerization means the time point at which the conversion of the monomer(s) is preferably not less than 80%, more preferably not less than 90%, still more preferably not less than 95%, most preferably not less than 99%.

The amount of the compound (I) to be added is not particularly restricted. Since the reactivity of the alkenyl group of such compound is not very high, it is preferred to increase the addition amount thereof for increasing the rate of reaction. On the other hand, for cost reduction purposes, that amount is desirably as close as possible to the equimolar amount relative to the growing terminus. It is thus necessary to optimize that amount according to circumstances.

When a compound having two alkenyl groups, inclusive of an internal alkenyl group(s), is used as the compound (I) to thereby introduce an alkenyl group terminally, the compound is added preferably in excess relative to the growing polymer terminus. An equimolar amount or a smaller amount may possibly allow both the two alkenyl groups to react, resulting in coupling of polymerization termini. In the case of a compound whose two alkenyl groups are equal in reactivity, the probability of occurrence of such coupling is determined statistically depending on the amount added in excess. Therefore, the amount is preferably not less than 1.5 times, more preferably not less than 3 times, still more preferably not less than 5 times.

The first aspect of the invention is also directed to a vinyl polymer having a functional group at a molecular chain terminus which is obtainable by the production method mentioned above.

The terminal functional group referred to above is one introduced by addition of an alkenyl group to a growing terminus in living radical polymerization of a vinyl polymer. Therefore, the above-mentioned vinyl polymer having a functional group at a molecular chain terminus is characterized in that the molecular chain contains no interposing hetero atom and approximately one functional group is bonded to one terminus of the polymer by means of direct carbon-carbon bonding alone.

The number of terminal groups contained in a molecule of the polymer is not particularly restricted but, when the polymer is used in a curable composition, for instance, two or more are preferably contained therein.

The polymer of the invention has a molecular weight distribution, namely weight average molecular weight (Mw)-to-number average molecular weight (Mn) ratio (Mw/Mn) as determined by gel permeation chromatography, of preferably not more than 1.8, more preferably not more than 1.6, most preferably not more than 1.3.

The polymer of the invention preferably has a number average molecular weight within the range of 500 to 100,000, more preferably 3,000 to 40,000. When the molecular weight is less than 500, the vinyl polymer will hardly manifest those characteristics which are intrinsic in vinyl polymers. When it is higher than 100,000, handling becomes difficult.

The polymer produced in accordance with the present invention is utilized as such, namely the functional group introduced is utilized as such, or after conversion of that group to some other functional group by conducting a further conversion reaction. More specifically, an alkenyl group can be converted to a crosslinking silyl group by the hydrosilylation reaction using a crosslinking silyl-containing hydrosilane compound. Suited for use as the alkenyl-terminated vinyl polymer are all of those obtainable by the method already illustrated hereinabove.

The hydrosilane compound is not particularly restricted but, as typical example, there may be mentioned compounds represented by the general formula 5:

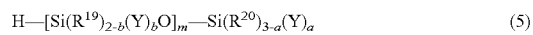

$$H\text{—}[Si(R^{19})_{2-b}(Y)_b O]_m\text{—}Si(R^{20})_{3-a}(Y)_a \quad (5)$$

wherein $R^{19}$ and $R^{20}$ each is an alkyl group containing 1 to 20 carbon atoms, an aryl group containing 6 to 20 carbon atoms, an aralkyl group containing 7 to 20 carbon atoms or a triorganosiloxy group represented by $(R')_3SiO$—(in which R' is a hydrocarbon group containing 1 to 20 carbon atoms and the three R' groups may be the same or different) and, when two or more $R^{19}$ or $R^{20}$ exist, they may be the same or different; Y represents a hydroxyl group or a hydrolyzable group and, when two or more Y groups exist, they may be the same or different; a represents 0, 1, 2 or 3, b represents 0, 1 or 2 and m is an integer of 0 to 19 provided that the relation $a+mb \geq 1$ is to be satisfied.

The above hydrolyzable group represented by Y is not particularly restricted but any of those known in the art may be used. Specifically, there may be mentioned hydrogen, halogen atoms, and alkoxy, acyloxy, ketoximato, amino, amido, acid amide, aminoxy, mercapto, alkenyloxy and like groups. From the mild hydrolyzability and easy handling viewpoint, alkoxy groups are particularly preferred. One to three groups selected from among the hydrolyzable and hydroxyl groups can be bonded to a silicon atom and the sum a+mb, namely the total number of hydrolyzable groups, is preferably within the range of 1 to 5. When the reactive silyl group contains two or more hydrolyzable and/or hydroxyl groups bonded thereto, these may be the same or different. The number of silicon atoms constituting the crosslinking silicon compound may be one or two or more. In the case of silicon atoms linked by siloxane bonding, the number may be up to about 20.

As specific examples of $R^{19}$ and $R^{20}$, there may be mentioned, among others, alkyl groups such as methyl and ethyl, cycloalkyl groups such as cyclohexyl, aryl groups such as phenyl, aralkyl groups such as benzyl, and triorganosilyl groups represented by (R')$_3$SiO— in which R' is methyl or phenyl, for instance.

Among such hydrosilane compounds, crosslinking group-containing hydrosilane compounds represented by the general formula 6:

$$H—Si(R^{20})_{3-a}(Y)_a \quad (6)$$

wherein $R^{20}$, Y and a are as defined above, are preferred from the ready availability viewpoint. As specific examples of the crosslinking group-containing hydrosilane compound represented by the general formula 5 or 6, there may be mentioned, among others:

HSiCl$_3$, HSi(CH$_3$)Cl$_2$, HSi(CH$_3$)$_2$Cl, HSi(OCH$_3$)$_3$, HSi(CH$_3$)(OCH$_3$)$_2$,
HSi(CH$_3$)$_2$OCH$_3$, HSi(OC$_2$H$_5$)$_3$, HSi(CH$_3$)(OC$_2$H$_5$)$_2$, HSi(CH$_3$)$_2$OC$_2$H$_5$,
HSi(OC$_3$H$_7$)$_3$, HSi(C$_2$H$_5$)(OCH$_3$)$_2$, HSi(C$_2$H$_5$)$_2$OCH$_3$, HSi(C$_6$H$_5$)(OCH$_3$)$_2$,
HSi(C$_6$H$_5$)$_2$(OCH$_3$), HSi(CH$_3$)(OC(O)CH$_3$)$_2$, HSi(CH$_3$)$_2$O—[Si(CH$_3$)$_2$O]$_2$—
Si(CH$_3$)(OCH$_3$)$_2$, HSi(CH$_3$)[O—N=C(CH$_3$)$_2$]$_2$ (in the above chemical formulas, C$_6$H$_5$ represents a phenyl group).

In causing such a crosslinking silyl-containing hydrosilane compound to add to an alkenyl-terminated vinyl polymer, a hydrosilylation catalyst is used. As such hydrosilylation catalyst, there may be mentioned radical initiators such as organic peroxides and azo compounds as well as transition metal catalysts.

The radical initiator is not particularly restricted but may be any of various compounds. As examples, there may be mentioned dialkyl peroxides such as di-tert-butyl peroxide, 2,5-dimethyl-2,5-di(tert-butylperoxy)hexane, 2,5-dimethyl-2,5-di(tert-butylperoxy)-3-hexyne, dicumyl peroxide, tert-butyl cumyl peroxide and α,α'-bis(tert-butylperoxy)isopropylbenzene, diacyl peroxides such as benzoyl peroxide, p-chlorobenzoyl peroxide, m-chlorobenzoyl peroxide, 2,4-dichlorobenzoyl peroxide and lauroyl peroxide, peresters such as tert-butyl perbenzoate, peroxydicarbonates such as diisopropyl peroxydicarbonate and di-2-ethylhexyl peroxydicarbonate, and peroxyketals such as 1,1-di(tert-butylperoxy)cyclohexane and 1,1-di(tert-butylperoxy)-3,3,5-trimethylcyclohexane, among others.

As the transition metal catalyst, there may be mentioned, for example, simple substance platinum, solid platinum dispersed on a support such as alumina, silica or carbon black, chloroplatinic acid, complexes of chloroplatinic acid with alcohols, aldehydes, ketones or the like, platinum-olefin complexes and platinum (0)-divinyltetramethyldisiloxane complex. As examples of the catalyst other than platinum compounds, there may be mentioned RhCl(PPh$_3$)$_3$, RhCl$_3$, RuCl$_3$, IrCl$_3$, FeCl$_3$, AlCl$_3$, PdCl$_2$.H$_2$O, NiCl$_2$, TiCl$_4$, etc. These catalyst may be used singly or two or more of them may be used combinedly. The amount of the catalyst is not particularly restricted but recommendably is within the range of $10^{-1}$ to $10^{-8}$ mole, preferably within the range of $10^{-3}$ to $10^{-6}$ mole, per mole of the alkenyl group in the polymer. When it is less than $10^{-8}$ mole, the curing may not proceed to a sufficient extent. Since the hydrosilylation catalyst is expensive, it is recommendable that it not be used in an amount exceeding $10^{-1}$ mole.

The hydroxyl group at a molecular chain terminus can be converted to an alkenyl group by the condensation reaction with allyl chloride or allyl bromide using an alkaline compound. It can also be converted to an epoxy group by the same reaction using epichlorohydrin.

Furthermore, the hydroxyl or amino group at a molecular chain terminus can be converted to a crosslinking silyl group by reacting with a crosslinking silyl group-containing compound having a functional group capable of reacting with a hydroxyl or amino group. As the functional group capable of reacting with a hydroxyl or amino group, there may be mentioned, among others, halogens, and carboxylic acid halide, carboxylic acid, isocyanato and like groups. The isocyanato group is preferred, however, in view of ready availability of compounds, mild reaction conditions in reacting with the hydroxyl group and resistance to crosslinking silyl group decomposition.

Such crosslinking silyl-containing isocyanate compound is not particularly restricted but may be any of those known in the art. As specific examples, there may be mentioned, among others, the following:

(CH$_3$O)$_3$Si—(CH$_2$)$_n$—NCO, (CH$_3$O)$_2$(CH$_3$)Si—(CH$_2$)$_n$—NCO, (C$_2$H$_5$O)$_3$Si—(CH$_2$)$_n$—NCO, (C$_2$H$_5$O)$_2$(CH$_3$)Si—(CH$_2$)$_n$—NCO, (i-C$_3$H$_7$O)$_3$Si—(CH$_2$)$_n$—NCO, (i-C$_3$H$_7$O)$_2$(CH$_3$)Si—(CH$_2$)$_n$—NCO, (CH$_3$O)$_3$Si—(CH$_2$)$_n$—NH—(CH$_2$)$_m$—NCO, (CH$_3$O)$_2$(CH$_3$)Si—(CH$_2$)$_n$—NH—(CH$_2$)$_m$—NCO, (C$_2$H$_5$O)$_3$Si—(CH$_2$)$_n$—NH—(CH$_2$)$_m$—NCO, (C$_2$H$_5$O)$_2$(CH$_3$)Si—(CH$_2$)$_n$—NH—(CH$_2$)$_m$—NCO, (i-C$_3$H$_7$O)$_3$Si—(CH$_2$)$_n$—NH—(CH$_2$)$_m$—NCO, (i-C$_3$H$_7$O)$_2$(CH$_3$)Si—(CH$_2$)$_n$—NH—(CH$_2$)$_m$—NCO, (in the above formulas, n and m each is an integer of 1 to 20).

The reaction between the hydroxyl-terminated vinyl polymer and the crosslinking silyl-containing isocyanate compound can be carried out without using any solvent or in any of various solvents at a reaction temperature of 0° C. to 100° C., preferably 20° C. to 50° C. On that occasion, any of the tin catalysts or tertiary amine catalysts already mentioned hereinbefore can be used for promoting the reaction between the hydroxyl and isocyanate groups.

Furthermore, the first aspect of the invention is directed to a curable composition which comprises the above vinyl polymer having a functional group at a molecular chain terminus and in which one of various crosslinking reactions is utilized.

The alkenyl-terminated polymer can be used in formulating a curable composition comprising (A) the alkenyl-containing polymer and (B) a compound having at least two hydrosilyl groups.

The component (A), alkenyl-terminated vinyl polymer may be used singly or a mixture of two or more thereof may be used. The molecular weight of the component (A) is not particularly restricted but preferably within the range of 500 to 100,000, more preferably 3,000 to 40,000. When it is less than 500, those characteristics which are intrinsic in vinyl polymers will be hardly manifested and, when it is above 100,000, a very high viscosity or a decreased solubility will result, rendering the handling difficult.

The component (B), namely hydrosilyl-containing compound, is not particularly restricted but may be any of various ones. Thus, use may be made of linear polysiloxanes represented by the general formula 7 or 8:

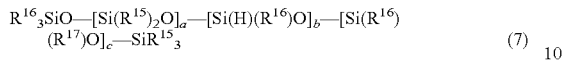
(7)

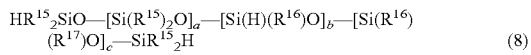
(8)

wherein $R^{15}$ and $R^{16}$ each represents an alkyl group containing 1 to 6 carbon atoms or a phenyl group, $R^{17}$ represents an alkyl group containing 1 to 10 carbon atoms or an aralkyl group containing 7 to 10 carbon atoms, a represents an integer $0 \leq a \leq 100$, b an integer $2 \leq b \leq 100$ and c an integer. $0 \leq c \leq 100$); and cyclic siloxanes represented by the general formula 9:

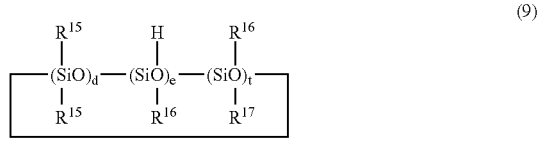
(9)

wherein $R^{15}$ and $R^{16}$ each represents an alkyl group containing 1 to 6 carbon atoms or a phenyl group, $R^{17}$ represents an alkyl group containing 1 to 10 carbon atoms or an aralkyl group containing 7 to 10 carbon atoms, d represents an integer $0 \leq d \leq 8$, e an integer $2 \leq e \leq 10$ and f an integer $0 \leq f \leq 8$ on These may be used singly or two or more of them may be used in admixture. Among these siloxanes, those phenyl-containing linear siloxanes represented by the general formula 10 or 11 given below and phenyl-containing cyclic siloxanes represented by the general formula 12 or 13 given below are preferred in view of the compatibility with the vinyl polymers.

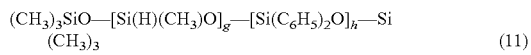
(11)

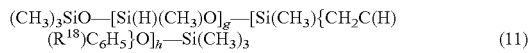
(11)

(in the formulas, $R^{18}$ represents a hydrogen atom or a methyl group, g represents an integer $2 \leq g \leq 100$ and h an integer $0 \leq h \leq 100$ and $C_6H_5$ represents a phenyl group);

(12)

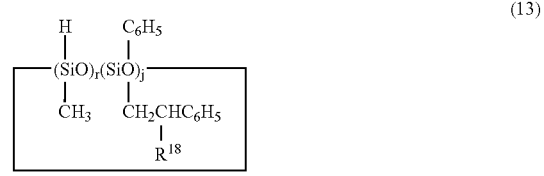
(13)

(in the formulas, $R^{18}$ represents a hydrogen atom or a methyl group, i represents an integer $2 \leq i \leq 10$ and j an integer $0 \leq j \leq 8$ on condition that $3 \leq i+j \leq 10$ and $C_6H_5$ represents a phenyl group).

Also useful as the component (B), namely curing agent having at least two hydrosilyl groups, are compounds obtainable by subjecting a hydrosilyl-containing compound represented by one of the general formulas 7 to 13 to addition reaction with a low-molecular compound having two alkenyl groups per molecule so that the hydrosilyl-containing group may partly remain even after the reaction. Useful as the compound having two or more alkenyl groups per molecule are various compounds. As examples, there may be mentioned hydrocarbon compounds such as 1,4-pentadiene, 1,5-hexadiene, 1,6-heptadiene, 1,7-octadiene, 1,8-nonadiene and 1,9-decadiene, ether compounds such as O,O'-diallylbisphenol A and 3,3'-diallylbisphenol A, ester compounds such as diallyl phthalate, diallyl isophthalate, triallyl trimellitate and tetraallyl pyromellitate, and carbonate compounds such as diethylene glycol diallyl carbonate.

The above compounds can be obtained by slowly adding dropwise an alkenyl-containing compound as mentioned above to an excessive amount of a hydrosilyl-containing compound in the presence of a hydrosilylation catalyst. Preferred among such compounds in view of ready availability of starting materials, ease of removal of the siloxane used in excess and, further, compatibility with the component (A) polymer are the following:

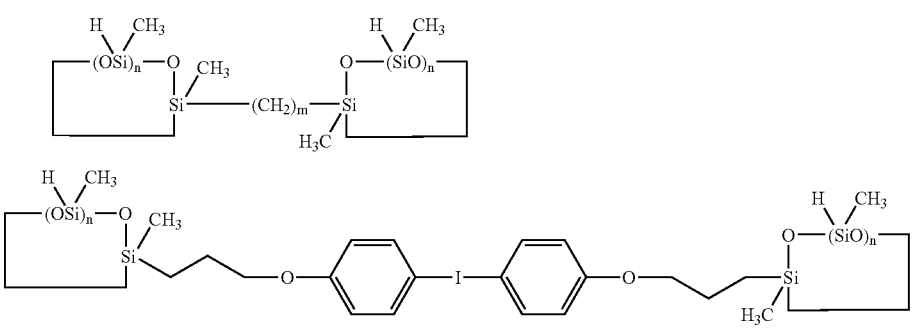

-continued

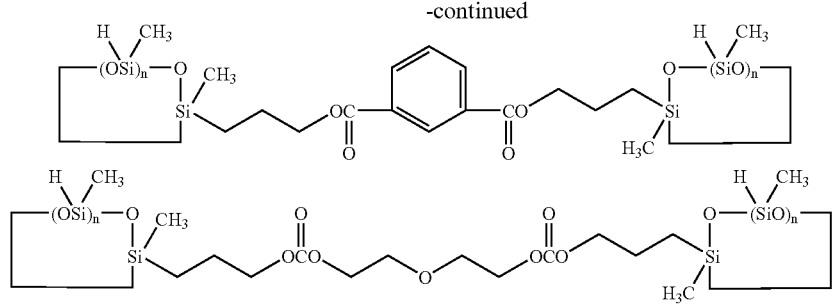

(n being an integer of 2 to 4 and m being an integer of 5 to 10).

The polymer (A) and curing agent (B) Can be blended in an arbitrary ratio. From the curability viewpoint, however, the alkenyl-to-hydrosilyl mole ratio is preferably within the range of 5 to 0.2, more preferably 2.5 to 0.4. When the mole ratio is not less than 5, the curing becomes insufficient, hence only sticky cured products low in strength are obtained. When it is less than 0.2, a large amount of the active hydrosilyl group remains in the cured products even after curing, causing formation of cracks and voids; any uniform and strong cured products cannot be obtained.

The curing reaction between the polymer (A) and curing agent (B) proceeds upon blending the two components and heating. For allowing the reaction to proceed more rapidly, a hydrosilylation catalyst is added. As such hydrosilylation catalyst, any of those various ones already mentioned hereinabove may be used.

The vinyl polymer having a crosslinking silyl group at a molecular chain terminus can be used in a curable composition which comprises the polymer as the main component.

Upon coming into contact with water or moisture, the vinyl polymer having a crosslinking silyl group at a molecular chain terminus is cured in a three-dimensional manner by the curing reaction. Since the rate of hydrolysis depends on the temperature, humidity and hydrolyzable group species, an appropriate hydrolyzable group should be selected according to the use conditions.

For promoting the curing reaction, a condensation catalyst may be added. As the condensation catalyst, use may be made of one or two of known silanol condensation catalysts, as necessary, for example titanate esters such as tetrabutyl titanate and tetrapropyl titanate; organotin compounds such as dibutyltin dilaurate, dibutyltin maleate, dibutyltin diacetate, stannous octoate and stannous naphtheneate; lead octylate; amine compounds such as butylamine, octylamine, dibutylamine, monoethanolamine, diethanolamine, triethanolamine, diethylenetriamine, triethylenetetramine, oleylamine, octylamine, cyclohexylamine, benzylamine, diethylaminopropylamine, xylylenediamine, triethylenediamine, guanidine, diphenylguanidine, 2,4,6-tris(dimethylaminomethyl)phenol, morpholine, N-methylmorpholine and 1,3-diazabicyclo[5.4.6]undecene-7, or salts of these amine compounds with carboxylic acids; low-molecular polyamide resins obtained from an excess polyamine and a polybasic acid; reaction products from an excess polyamine and an epoxy compound; amino-containing silane coupling agents such as γ-aminopropyltrimethoxysilane and N-(β-aminoethyl)aminopropylmethyldimethoxysilane; and the like. They are preferably used in an amount of 0.01 to 10% by weight relative to the crosslinking silyl-terminated vinyl polymer.

When an alkoxy group is used as the hydrolyzable silyl group Y, this polymer, if used alone, shows a slow rate of curing, hence the use of a curing catalyst is preferred.

When the crosslinking silyl-terminated vinyl polymer, which is the main component, is admixed with a condensation catalyst as necessary and allowed to be cured, uniform cured products can be obtained. While the curing conditions are not particularly restricted, the curing reaction is generally effected at 0 to 100° C., preferably 10 to 50° C., for about 1 hour to 1 week. Although the properties of the cured products depend on the main chain skeleton and molecular weight of the polymer, a wide varieties of products, from rubber-like ones to resin-like ones, can be produced.

When the crosslinking silyl-terminated vinyl polymer, which is the main component, is admixed with a condensation catalyst as necessary and allowed to be cured, uniform cured products can be obtained. While the curing conditions are not particularly restricted, the curing reaction is generally effected at 0 to 100° C., preferably 10 to 50° C., for about 1 hour to 1 week. Although the properties of the cured products depend on the main chain skeleton and molecular weight of the polymer, a wide varieties of products, from rubber-like ones to resin-like ones, can be produced.

Furthermore, the vinyl polymer having a hydroxyl group at a molecular chain terminus can be used in a curable composition which comprises that polymer as the main component. This curable composition comprises, as essential components thereof, the following two components: (A) the hydroxyl-terminated vinyl polymer and (B) a compound having two or more functional groups capable of reacting with the hydroxyl group. The polymer may have an amino group in lieu of the hydroxyl group.

The hydroxyl-terminated vinyl polymer, namely component (A), may be used singly or two or more thereof may be used in mixture. The molecular weight thereof is not particularly restricted but preferably is within the range of 500 to 100,000. When it is less than 500, those characteristics which are intrinsic in vinyl polymers will be hardly manifested and, when it is above 100,000, a very high viscosity or a decreased solubility will result, rendering the handling difficult in certain instances.

The compound having two or more functional groups capable of reacting with a hydroxyl group of component (B) is not particularly restricted but includes, among others, polyisocyanate compounds having two or more isocyanato groups per molecule, aminoplast resins such as methylolmelamines and alkyl-etherified derivatives thereof or low condensation products therefrom, polyfunctional carboxylic acids and halides thereof.

Useful as the polyisocyanates having two or more isocyanato groups per molecule are those known in the art, for example isocyanate compounds such as 2,4-tolylene diisocyanate, 2,6-tolylene diisocyanate, 4,4'-diphenylmethanediisocyanate, hexamethylene diisocyanate, xylylene diisocyanate, metaxylylene diisocyanate, 1,5-naphthalenediisocyanate, hydrogenated diphenylmethanediisocyanate, hydrogenated tolylene diisocyanate, hydrogenated xylylene diisocyanate, isophoronediisocyanate, Ipposha Yushi's B-45 and like triisocyanates, biuret polyisocyanate compounds such as Sumidur N (product of Sumitomo Bayer Urethane), isocyanurate ring-containing polyisocyanates such as Desmodur IL and HL (products of Bayer A.-G.) and Coronate EH (product of Nippon Polyurethane Industry), adduct polyisocyanate compounds such as Sumidur L (product of Sumitomo Bayer Urethane), and adduct polyisocyanate compounds such as Coronate HL (product of Nippon Polyurethane Industry). Blocked isocyanates may also be used. These may be used singly or two or more of them may be used.

The mixing ratio between the hydroxyl-terminated polymer and the compound having two or more isocyanato groups is not particularly restricted but, for example, the ratio between the isocyanato groups and the hydroxyl groups of the hydroxyl-terminated vinyl polymer (NCO/OH (mole ratio)) is preferably 0.5 to 3.0, more preferably 0.8 to 2.0.

For promoting the curing reaction between the hydroxyl-terminated vinyl polymer and the compound having two or more isocyanato groups, a catalyst known in the art, such as an organotin compound or a tertiary amine, may be added according to need.

As specific examples of the organotin compound, there may be mentioned stannous octoate, dibutyltin diacetate, dibutyltin dilaurate, dibutyltin mercaptides, dibutyltin thiocarboxylates, dibutyltin dimaleates, dioctyltin thiocarboxylates and the like. As the tertiary amine catalyst, there may be mentioned triethylamine, N,N-dimethylcyclohexylamine, N,N,N',N'-tetramethylethylenediamine, N,N,N',N'-tetramethylpropane-1,3-diamine, N,N,N',N'-tetramethylhexane-1,6-diamine, N,N,N',N'',N''-pentamethyldiethylenetriamine, N,N,N',N'',N''-pentamethyldipropylenetriamine, tetramethylguanidine, triethylenediamine, N,N'-dimethylpiperazine, N-methylmorpholine, 1,2-dimethylimidazole, dimethylaminoethanol, dimethylaminoethoxyethanol, N,N,N'-trimethylaminoethylethanolamine, N-methyl-N'-(2-hydroxyethyl)piperazine, N-(2-hydroxyethyl)morpholine, bis(2-dimethylaminoethyl)ether, ethylene glycol bis(3-dimethylaminopropyl)ether and the like.

The aminoplast resin to be used in the curable composition of the invention is not particularly restricted but includes addition products from melamine and formaldehyde (methylol compounds), low condensates from melamine and formaldehyde, and alkyl-etherifired modifications thereof, as well as urea resins and the like. These may be used singly or two or more of them may be used in combination. For promoting the curing reaction between the hydroxyl-terminated (meth)acrylic polymer and the aminoplast resin, a known catalyst such as p-toluenesulfonic acid or benzenesulfonic acid may be used.

The compound having two or more carboxyl groups per molecule, which is to be used in the curable composition of the invention is not particularly restricted but includes, among others, polyfunctional carboxylic acids and anhydrides thereof, such as oxalic acid, malonic acid, succinic acid, glutaric acid, adipic acid, phthalic acid, phthalic anhydride, terephthalic acid, trimellitic acid, pyromellitic acid, maleic acid, maleic anhydride, fumaric acid and itaconic acid as well as halides of these. These may be used singly or two or more of them may be used in combination.

By mixing up the two components (A) and (B) according to the invention, if necessary together with a curing catalyst, it is possible to obtain uniform cured products excellent in degree of depth curing. Although the curing conditions are not particularly restricted, the curing is generally carried out at 0° C. to 100° C., preferably 20° C. to 80° C.

While the properties of the cured product depend on the main chain skeleton and molecular weight of the (A) Component polymer and (B) Component curing agent, a wide variety of products can be produced, from rubber-like to resin-like.

Further, the polymer having an epoxy group at a molecular chain terminus can be used in a curable composition which comprises (A) the epoxy-terminated polymer and (B) a curing agent for epoxy resins. Usable as the curing agent (B) are various ones, for example aliphatic amines, aromatic amines, acid anhydrides, urea, melamine and phenol resins.

Specific uses of the cured products obtainable from the compositions of the invention as mentioned above include sealing materials, adhesives, pressure-sensitive adhesives, elastic adhesives, coatings, powder coatings, foamed articles, potting materials for electric and electronic use, films, molding materials and artificial marble, among others.

The second aspect of the invention is now described.

In accordance with the second aspect of the invention, it is possible to produce a vinyl polymer having a functional group at a molecular chain terminus by adding a conjugated polyene compound (II) on the occasion of living radical polymerization of a radical-polymerizable vinyl monomer, whereby the reaction of the growing polymer terminus with the conjugated polyene structure allows the functional group(s) derived from the compound (II) (the alkenyl group remaining after the reaction of the conjugated polyene structure and, when the compound (II) has a functional group in addition to the conjugated polyene structure, the functional group) to be introduced into the polymer at a molecular terminus. In the second aspect of the invention, it is possible to react approximately one molecule of the compound (II) with one molecular chain terminus, so that terminally functionalized vinyl polymers with a very well controlled structure can be obtained. These vinyl polymers are very stable from the weathering resistance viewpoint since, therein, the functional group is bonded to the main chain by carbon-carbon bonding.

The conjugated polyene structure in the conjugated polyene compound (II) is not particularly restricted but includes, as examples, the following:

$CH_2=CH—CH=CH—$, $CH_2=C(CH_3)—CH=CH—$, $CH_2=CH—C(CH_3)=CH—$, $CH_2=CH—CH=C(CH_3)—$, $R'—C(R'')=C(R^1)—C(R^2)=C(R^3)—$, $CH_2=CH—CH=CH—CH=CH—$,

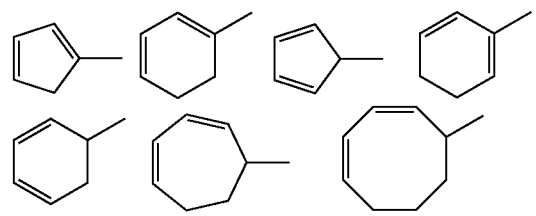

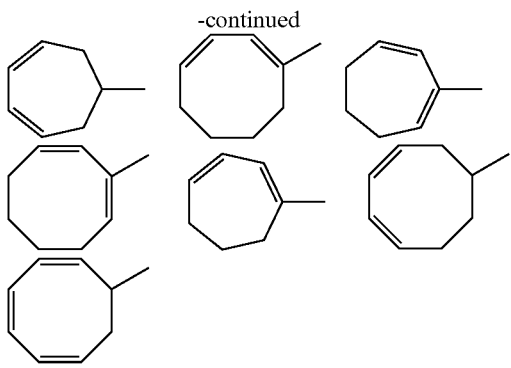

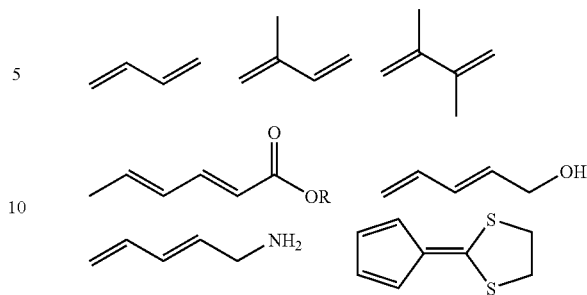

(in the above formulas, R', R", $R^1$, $R^2$ and $R^3$ each is a hydrogen atom or an organic group, preferably a hydrocarbon group, containing 1 to 20 carbon atoms; they may be the same or different or any two of them may be coupled together to form a ring structure).

Specific examples of R', R", $R^1$, $R^2$ and $R^3$ are not particularly restricted but include the following: $-(CH_2)_n-$, $-CH_3$, $-CH(CH_3)-(CH_2)_n-CH_3$, $-CH(CH_2CH_3)-(CH_2)_{n-CH_3}$, $-CH(CH_2CH_3)_2$, $-C(CH_3)_2-(CH_2)_n-CH_3$, $-C(CH_3)(CH_2CH_3)-(CH_2)_n-CH_3$, $-C_6H_5$, $-C_6H_5(CH_3)$, $-C_6H_5(CH_3)_2$, $-(CH_2)_n-C_6H_5$, $-(CH_2)_n-C_6H_5(CH_3)$, $-(CH_2)_n-C_6H_5(CH_3)_2$ (n being an integer of not less than 0 and the total number of carbon atoms in each group being not more than 20).

Among them, a conjugated diene structure is preferred as the conjugated polyene structure from the ready availability viewpoint.

The conjugated polyene compound (II) may be a compound having a conjugated polyene structure alone or a compound having a conjugated polyene structure and another functional group. In the case of a compound having a conjugated polyene structure alone, the functional group to be introduced into the polymer at a molecular chain terminus is an alkenyl group. In the case of a compound having a conjugated polyene structure and another functional group, the alkenyl group and the other functional group are the functional groups to be introduced.

The functional group to be introduced into the polymer at a molecular chain terminus is not particularly restricted but includes, as preferred species, hydroxyl, amino, epoxy, carboxyl, ester, ether, amido, crosslinking silyl and terminal or internal alkenyl groups. More preferred are hydroxyl, amino, epoxy, crosslinking silyl, and terminal or internal alkenyl groups. Particularly preferred are terminal or internal alkenyl groups, however. When the compound (II) has an terminal or internal alkenyl group in addition to a conjugated polyene structure, these are not conjugated with the conjugated polyene structure.

When the functional group which the compound (II) has is one possibly affecting the growing polymer terminus or catalyst, for example an amino, hydroxyl or carboxyl group, such functional group can be used in a form protected with a conventional protective group. As appropriate protective groups, there may be mentioned acetyl, silyl and alkoxy groups.

The conjugated polyene compound (II) is not particularly restricted but specifically includes the following:

(R being a hydrogen atom or an organic group containing 1 to 20 carbon atoms).

In particular, isoprene, piperylene and butadiene are preferred in view of their reactivity and ready availability.

The living radical polymerization and polymerization conditions to be applied in accordance with the second aspect of the invention as well as the radical-polymerizable vinyl monomer to be used therein are the same as those mentioned hereinabove referring to the first aspect of the invention.

In the above production method, the conjugated polyene compound (II) is preferably added at the end point of polymerization so that polymers with a controlled structure may be obtained. The end point of polymerization so referred to herein is the time point at which preferably not less than about 80 mole percent, more preferably not less than 90 mole percent, still more preferably not less than 95 mole percent, still more preferably not less than 99 mole percent, of all the monomers have reacted.

While the addition amount of the conjugated polyene compound (II) is not particularly restricted, it is possible to introduce approximately one (one pair of) functional group(s) into each molecular chain terminus by adding that in an approximately equimolar amount relative to the number of moles of the molecular chain terminus.

When the atom transfer radical polymerization technique is used as the method of living radical polymerization, a halogen group remains at the molecular chain terminus, together with the functional group introduced, in the vinyl polymer obtained in the above manner and having the functional group at a molecular chain terminus. The remaining terminal halogen group can be removed by a substitution or elimination reaction by treating such polymer with an alkaline compound. The above alkaline compound is not particularly restricted but includes such inorganic compounds as sodium hydroxide and potassium hydroxide.

The vinyl polymers obtainable by the production method according to the second aspect of the invention also has the properties mentioned hereinbefore and can be used in the same curable composition as mentioned hereinbefore.

BEST MODES FOR CARRYING OUT THE INVENTION

In the following, several specific examples of this invention are described. It is to be noted, however, that the following examples are by no means limitative of the scope of this invention.

Example 1

A 200-mL glass reactor was charged, under nitrogen, with butyl acrylate (100.0 mL, 89.4 g, 697.5 mmol), cuprous bromide (375 mg, 2.62 mmol), diethyl 2,5-dibromoadipate (3.14 g, 8.72 mmol) and acetonitrile (10 mL). The mixture was heated at 70° C. with stirring, and the polymerization was initiated by adding pentamethyldiethylenetriamine (0.18 mL, 151 mg, 0.87 mmol).

After 125 minutes, 4-vinylcyclohexene (22.67 mL, 18.86 g, 174.4 mmol) was added and pentamethyldiethylenetriamine was added. At this time point, the conversion of butyl acrylate was about 90%. Stirring with heating was continued at 70° C. for 280 minutes. The mixture was treated with activated alumina and the excess 4-vinylcyclohexene (boiling point 126° C.) was distilled off by heating under reduced pressure. It was confirmed by $^1$H-NMR spectrometry that the internal alkenyl group of 4-vinylcyclohexene had been consumed and the polymer had a terminal alkenyl group.

Example 2

The polymerization was carried out in the same manner as in Example 1 and 1,5-cyclooctadiene was added in lieu of 4-vinylcyclohexene. After treatment in the same manner, it was confirmed by $^1$H-NMR spectrometry that an alkenyl group had been introduced into the polymer.

Example 3

The alkenyl-terminated polybutyl acrylate polymer synthesized in the same manner as in Examples 1 and 2 was reacted with methyldichlorosilane using a platinum catalyst. The hydrosilylation reaction proceeded and the silyl group was introduced terminally into the polymer.

Example 4

Water and a tin catalyst were added to the crosslinking silyl-terminated polybutyl acrylate polymer synthesized in the same manner as in Example 3, whereupon a rubber-like cured product was obtained.

Example 5

Using butyl acrylate, cuprous bromide, diethyl 2,5-dibromoadipate, acetonitrile and pentamethyl-diethylenetriamine, the polymerization was carried out in the manner of atom transfer radical polymerization. At the end point of the polymerization, isoprene was added. The mixture was treated with activated alumina and the volatile matter was distilled off by heating under reduced pressure. It was confirmed by $^1$H-NMR spectrometry that an alkenyl group had been introduced into the polymer.

Example 6

The alkenyl-terminated polybutyl acrylate polymer synthesized in the same manner as in Example 1 was reacted with methyldichlorosilane using a platinum catalyst. The hydrosilylation proceeded and the silyl group was introduced terminally into the polymer.

Example 7

Water and a tin catalyst were added to the crosslinking silyl-terminated polybutyl acrylate polymer synthesized in the same manner as in Example 2, whereupon a rubber-like cured product was obtained.

(Example 8) Alkenyl Group Introduction Using Myrcene

In a nitrogen atmosphere, a 100-mL glass reactor was charged with cuprous bromide (0.375 g, 2.62 mmol) and acetonitrile (5.00 mL), and the mixture was stirred with heating at 70° C. for 30 minutes. Thereto was added a solution of diethyl 2,5-dibromoadipate (1.57 g, 4.36 mmol) in butyl acrylate (50.0 mL, 0.349 mol), and the mixture was stirred at 70° C. for 20 minutes. Thereto was added pentamethyldiethylenetriamine (91.0 µL, 0.437 mmol). After the lapse of 170 minutes following the start of polymerization, myrcene (3-methylene-7-methyl-1,6-octadiene) (14.8 mL, 87.2 mmol) was added and, after 230 minutes, pentamethyldiethylenetriamine (91.0 µL, 0.437 mmol) was further added. After 335 minutes, the heating was discontinued. At this moment, the consumption of butyl acrylate was 90.7% as determined by GC. The mixture was diluted with ethyl acetate and treated with activated alumina, and the volatile matter was then distilled off under reduced pressure to give a light-yellow polymer. The polymer obtained had a number average molecular weight of 10,700, a weight average molecular weight of 12, 600 and a molecular weight distribution of 1.18 as determined by GPC (on polystyrene equivalent basis) $^1$H NMR spectrometry revealed that the diene moiety had selectively reacted. The alkenyl group introduction percentage on the number average molecular weight basis was 1.16.

INDUSTRIAL APPLICABILITY

The vinyl polymer of the invention which has a functional group at a molecular chain terminus is stable since the terminal functional group is bonded to the main chain through carbon-carbon bonding and, further, since the structure is well controlled, namely each terminus has only one functional group introduced, the polymer is useful in utilizing the same in a curable composition, for instance. According to the production method of the invention, it is possible to produce a vinyl polymer having a functional group at a molecular chain terminus as mentioned above from readily available starting materials in an easy and economical manner. Furthermore, the above vinyl polymer, either as such or when combined with an appropriate curing agent, can give rubber-like cured products excellent in heat resistance and weathering resistance.

The invention claimed is:

1. A production method of a vinyl polymer having a functional group at a molecular chain terminus
   which comprises adding a conjugated polyene compound (II) to thereby introduce the functional group derived from the compound (II) into the polymer at a molecular chain terminus in living radical polymerization of a radical-polymerizable vinyl monomer at an approximately equimolar amount relative to the number of moles of the molecular chain terminus.

2. The production method according to claim 1, wherein the functional group to be introduced into a molecular chain terminus is a hydroxyl, amino, epoxy, carboxyl, ester, ether, amido, crosslinking silyl or terminal or internal alkenyl group.

3. The production method according to claim 2, wherein the functional group to be introduced into a molecular chain terminus is a hydroxyl, amino, epoxy, crosslinking silyl or terminal or internal alkenyl group.

4. The production method according to claim 3,
wherein the functional group to be introduced into a molecular chain terminus is a terminal or internal alkenyl group.

5. The production method according to claim 1,
wherein a conjugated polyene structure in the conjugated polyene compound (II) is a conjugated diene structure.

6. The production method according to claim 5, wherein the conjugated polyene compound (II) is isoprene, piperylene or butadiene.

7. The production method according to claim 1,
wherein the living radical polymerization is carried out in the manner of atom transfer radical polymerization.

8. The production method according to claim 7,
wherein a complex of copper, nickel, ruthenium or iron is used as a metal complex catalyst.

9. The production method according to claim 8,
wherein a copper complex is used as a metal complex catalyst.

10. The production method according to claim 7,
wherein an organic halide having a functional group in addition to an initiation site or a halosulfonyl compound having a functional group in addition to an initiation site is used as an initiator.

11. The production method according to claim 7,
wherein an initiator having a plurality of initiation sites is used as an initiator.

12. The production method according to claim 1,
wherein the conjugated polyene compound (II) is added at the end point of the polymerization reaction.

13. A vinyl polymer
having a functional group at a molecular chain terminus, the vinyl polymer being obtained by a method comprising:
producing an intermediate vinyl polymer by the production method accounting to claim 1, and
then treating the intermediate vinyl polymer with an alkaline compound to produce the vinyl polymer.

14. A vinyl polymer
having a functional group at a molecular chain terminus and being obtained by the production method according to claim 1.

15. The polymer according to claim 14,
wherein the vinyl polymer is a (meth)acrylate polymer.

16. The polymer according to claim 15,
wherein the vinyl polymer is an acrylate ester polymer.

17. The polymer according to claim 15,
wherein the vinyl polymer is a butyl acrylate polymer.

18. The polymer according to claim 14
which has a number average molecular weight of 500 to 100,000.

19. The polymer according to claim 14
which has a weight average molecular weight (Mw)/number average molecular weight (Mn) ratio (Mw/Mn) of less than 1.8 as determined by gel permeation chromatography.

* * * * *